United States Patent
Tracy

(10) Patent No.: US 9,555,890 B2
(45) Date of Patent: *Jan. 31, 2017

(54) LOUDSPEAKER SYSTEM

(71) Applicant: Dennis A Tracy, Culver City, CA (US)

(72) Inventor: Dennis A Tracy, Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/874,085

(22) Filed: Oct. 2, 2015

(65) Prior Publication Data

US 2016/0023763 A1    Jan. 28, 2016

Related U.S. Application Data

(63) Continuation-in-part of application No. 13/551,090, filed on Jul. 17, 2012, now Pat. No. 9,232,313, which is a continuation of application No. 12/897,180, filed on Oct. 4, 2010, now Pat. No. 8,295,535.

(60) Provisional application No. 61/248,201, filed on Oct. 2, 2009.

(51) Int. Cl.
*B64D 11/00* (2006.01)
*H04R 5/02* (2006.01)

(52) U.S. Cl.
CPC ......... *B64D 11/00154* (2014.12); *H04R 5/023* (2013.01); *H04R 2205/024* (2013.01); *H04R 2499/13* (2013.01); *Y02T 50/46* (2013.01)

(58) Field of Classification Search
CPC .... B64D 11/00154; H04R 1/025; H04R 5/023
USPC ..... 181/141, 175, 148; 297/144, 217.4, 330; 297/188.16; 381/71.1, 86, 89, 301, 386, 381/388, 389, 107, 109, 302, 332, 395; 463/46; 244/118.6
See application file for complete search history.

(56) References Cited

U.S. PATENT DOCUMENTS

| | | | | |
|---|---|---|---|---|
| 3,512,605 A | * | 5/1970 | McCorkle | B60N 2/4876 181/141 |
| 3,870,834 A | | 3/1975 | Yeaple | |
| 3,944,020 A | * | 3/1976 | Brown | B60N 2/4876 181/141 |
| 4,042,791 A | * | 8/1977 | Wiseman | B60N 2/4876 181/141 |
| 4,516,656 A | * | 5/1985 | Fleshler | A47C 7/66 181/175 |
| 4,696,370 A | * | 9/1987 | Tokumo | H04R 5/023 181/141 |
| 4,991,222 A | * | 2/1991 | Nixdorf | H04R 5/023 297/391 |
| 5,143,055 A | | 9/1992 | Eakin | |
| 5,591,946 A | * | 1/1997 | Jehle | B60R 16/0239 181/141 |

(Continued)

*Primary Examiner* — Gerald Gauthier
(74) *Attorney, Agent, or Firm* — Welsh Flaxman & Gitler LLC

(57) ABSTRACT

A seat integrating a loudspeaker system includes a seat having a seat body having a horizontally oriented seat bottom and a seat back secured thereto. The loudspeaker system includes a sound assembly mounted within the seat back for selective movement between a storage orientation and a use orientation. The sound assembly includes a first support arm and a second support arm. A retraction control mechanism that moves the first support arm and the second support arm between the storage orientation and the extended use orientation. The system also includes a positioning system in communication with the retraction control mechanism, the positioning system including a user interface in the form of a graphical user interface allowing a user to input his or her position within the seat.

19 Claims, 13 Drawing Sheets

(56) References Cited

U.S. PATENT DOCUMENTS

| | | | |
|---|---|---|---|
| 5,784,473 A * | 7/1998 | Ferren | H04R 5/02 181/155 |
| 5,838,808 A * | 11/1998 | Prosser | A47C 7/72 297/217.1 |
| 5,887,071 A * | 3/1999 | House | H04R 5/02 381/332 |
| 6,181,550 B1 | 1/2001 | Kim | |
| 6,744,898 B1 | 6/2004 | Hirano | |
| 6,991,289 B2 * | 1/2006 | House | A47C 7/72 181/141 |
| 7,424,127 B1 * | 9/2008 | Holmi | H04R 5/023 381/302 |
| 7,466,832 B2 * | 12/2008 | House | B60N 2/44 381/107 |
| 7,684,577 B2 * | 3/2010 | Arai | A47C 7/72 381/302 |
| 7,753,163 B2 * | 7/2010 | Bouchard | B06B 3/00 181/148 |
| 8,045,743 B2 * | 10/2011 | Aylward | H04R 1/028 381/386 |
| 8,194,898 B2 | 6/2012 | Yokota | |
| 8,221,246 B2 * | 7/2012 | Lee | A47C 7/72 463/46 |
| 8,295,535 B2 * | 10/2012 | Tracy | B64D 11/0015 297/217.4 |
| 8,325,936 B2 * | 12/2012 | Eichfeld | H04S 7/302 381/302 |
| 8,565,442 B2 * | 10/2013 | Maeda | G10K 11/178 381/71.1 |
| 8,724,827 B2 * | 5/2014 | Hartung | H04R 1/403 381/302 |
| 8,777,313 B2 * | 7/2014 | Butt | A47C 7/38 297/330 |
| 9,090,332 B2 * | 7/2015 | Asao | B60R 13/0815 |
| 9,100,749 B2 * | 8/2015 | Hartung | H04R 1/403 |
| 2002/0070314 A1 * | 6/2002 | Schmidt-Schaeffer | B60N 2/01 244/118.6 |
| 2002/0076059 A1 | 6/2002 | Joynes | |
| 2005/0190935 A1 | 9/2005 | Sakamoto | |
| 2008/0187156 A1 | 8/2008 | Yokota | |
| 2010/0014683 A1 | 1/2010 | Maeda et al. | |
| 2010/0111317 A1 | 5/2010 | Asao et al. | |
| 2011/0163575 A1 * | 7/2011 | Kramer | A47C 7/62 297/144 |
| 2011/0280432 A1 * | 11/2011 | Tracy | B60R 11/0217 381/395 |
| 2014/0284976 A1 | 9/2014 | Riedel et al. | |
| 2015/0139462 A1 * | 5/2015 | Tracy | H04R 1/02 381/332 |
| 2016/0023763 A1 * | 1/2016 | Tracy | B64D 11/00154 381/301 |

* cited by examiner

LOUDSPEAKER SYSTEM

CROSS REFERENCE TO RELATED APPLICATION

This application is a continuation-in-part of U.S. patent application Ser. No. 13/551,090, entitled "Loudspeaker System", filed Jul. 17, 2012, which is currently pending, which is a continuation of U.S. patent application Ser. No. 12/897,180, entitled "Loudspeaker System", filed Oct. 4, 2010, which is now U.S. Pat. No. 8,295,535, which claims the benefit of U.S. Provisional Application No. 61/248,201, entitled "Loudspeaker System", filed Oct. 2, 2009.

BACKGROUND OF THE INVENTION

1. Field of the Invention

The invention relates to a loudspeaker system. More particularly, the invention relates to a loudspeaker system integrated into an aircraft seat for providing a passenger with high quality sound without disturbing those sitting in nearby seats.

2. Description of the Related Art

The current global community has made it possible for people all around the country, and around the world, to interact for both business and personal reasons. For many people, this requires they spend considerable time traveling from one location to another location. More often than not, these people travel in aircraft. Whether these people travel in private or commercial aircraft, they desire high quality entertainment during the many hours they spend within the confines of an aircraft. However, while high quality entertainment, for example, digital video with CD quality sound, is readily available for theater and home use, the weight and size requirements for use in aircrafts make it very difficult to incorporate high fidelity systems within an aircraft. This problem is especially pronounced for audio loudspeaker assemblies when one attempts to meet the size, weight and shape requirements for use in aircrafts.

In the aircraft industry, great priority is placed upon component weight and size reduction. In addition, spacing and positioning of the loudspeaker assemblies is a great priority to those optimizing the operation of aircraft. The size, weight and shape of conventional terrestrial loudspeaker assembly designs adversely affect range and payload. These concerns are notable when one attempts to make changes within smaller, private jets. In addition, the limited space available within an aircraft dictates the use of any space within the aircraft be carefully considered by those responsible for ensuring the comfort of passengers.

Lightweight and compact audio loudspeakers are currently available. These loudspeakers, however, substantially compromise sound quality for reductions in size and weight. An individual wishing to add an audio system to an aircraft must make a choice between high fidelity loudspeakers not suiting the size and weight requirements of the aircraft and lower quality loudspeakers providing desirable size and weight characteristics.

Recently, aircrafts have added "suite" options for international travelers. These "suites" offer passengers a higher level of privacy and service. One feature of these suites is private video monitors for each suite. While passengers may use headphones in conjunction with the video monitors, most people find headphones to be somewhat inconvenient when worn for long periods of time and would prefer to use ambient sound sources while watching a movie or listening to audio while aboard an aircraft.

A need, therefore, exists for a loudspeaker system providing high fidelity sound, while meeting the size, weight and convenience requirements for use within an aircraft. The present invention provides such a loudspeaker assembly.

SUMMARY OF THE INVENTION

It is, therefore, an object of the present invention to provide a seat integrating a loudspeaker system. The seat includes a seat body having a horizontally oriented seat bottom and a seat back secured thereto. The seat back includes an upper end and a lower end, wherein the lower end is positioned adjacent the seat bottom. The loudspeaker system includes a sound assembly mounted within the seat back for selective movement between a storage orientation in which the sound assembly is housed and hidden within a support housing mounted along the seat back and a use orientation extending from the support housing in which the sound assembly is positioned for use. The sound assembly includes a first support arm and a second support arm. The first support arm extends from a first side of the support housing and the second support arm extends from a second side of the support housing. A retraction control mechanism moves the first support arm and the second support arm between the storage orientation and the use orientation. The retraction control mechanism is composed of a drive assembly selectively retracting and extending the first support arm from the support housing and selectively retracting and extending the second support arm from the support housing.

It is also an object of the present invention to provide a seat further including a third support arm.

It is another object of the present invention to provide a seat wherein the first support arm is arcuately shaped and the second support arm is arcuately shaped.

It is a further object of the present invention to provide a seat wherein the sound assembly is a directional sound assembly and the first and second support arms support high frequency drivers.

It is also an object of the present invention to provide a seat wherein the sound assembly includes first and second mid-range drivers mounted within the support housing.

It is another object of the present invention to provide a seat wherein the first support arm is arcuately shaped to wrap about one side of a passenger sitting within the seat and the second support arm is arcuately shaped to wrap about an opposite side of a passenger sitting within the seat, and the first and second support arms transmit sound generated by mid-range drivers.

It is a further object of the present invention to provide a seat wherein the first and second support arms transmit sound generated by mid-range drivers.

It is also an object of the present invention to provide a seat including a nondirectional sound assembly having a low frequency driver assembly secured at a position adjacent an underside of the seat bottom.

It is another object of the present invention to provide a seat wherein output of the low frequency driver assembly is ported for transmitting the low frequency elements of a sound signal within the immediate proximity of the passenger as he or she sits within the seat.

It is a further object of the present invention to provide a seat wherein the low frequency driver assembly includes first and second subwoofers.

It is also an object of the present invention to provide a seat integrating a loudspeaker system. The seat includes a seat body having a horizontally oriented seat bottom and a seat back secured thereto. The seat back includes an upper end and a lower end, and the lower end is positioned adjacent the seat bottom. The loudspeaker system includes a sound assembly mounted within the seat back for selective movement between a storage orientation in which the sound assembly is housed and hidden within a support housing mounted along the seat back and a use orientation extending from the support housing in which the sound assembly is positioned for use. The sound assembly includes a first support arm and a second support arm. The first support arm extends from a first side of the support housing and the second support arm extends from a second side of the support housing. A retraction control mechanism moves the first support arm and the second support arm between the storage orientation and the use orientation. The retraction control mechanism is composed of a drive assembly selectively retracting and extending the first support arm from the support housing and selectively retracting and extending the second support arm from the support housing. A positioning system is in communication with the retraction control mechanism. The positioning system includes a user interface in the form of a graphical user interface allowing a user to input his or her position within the seat.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

Figure 1:
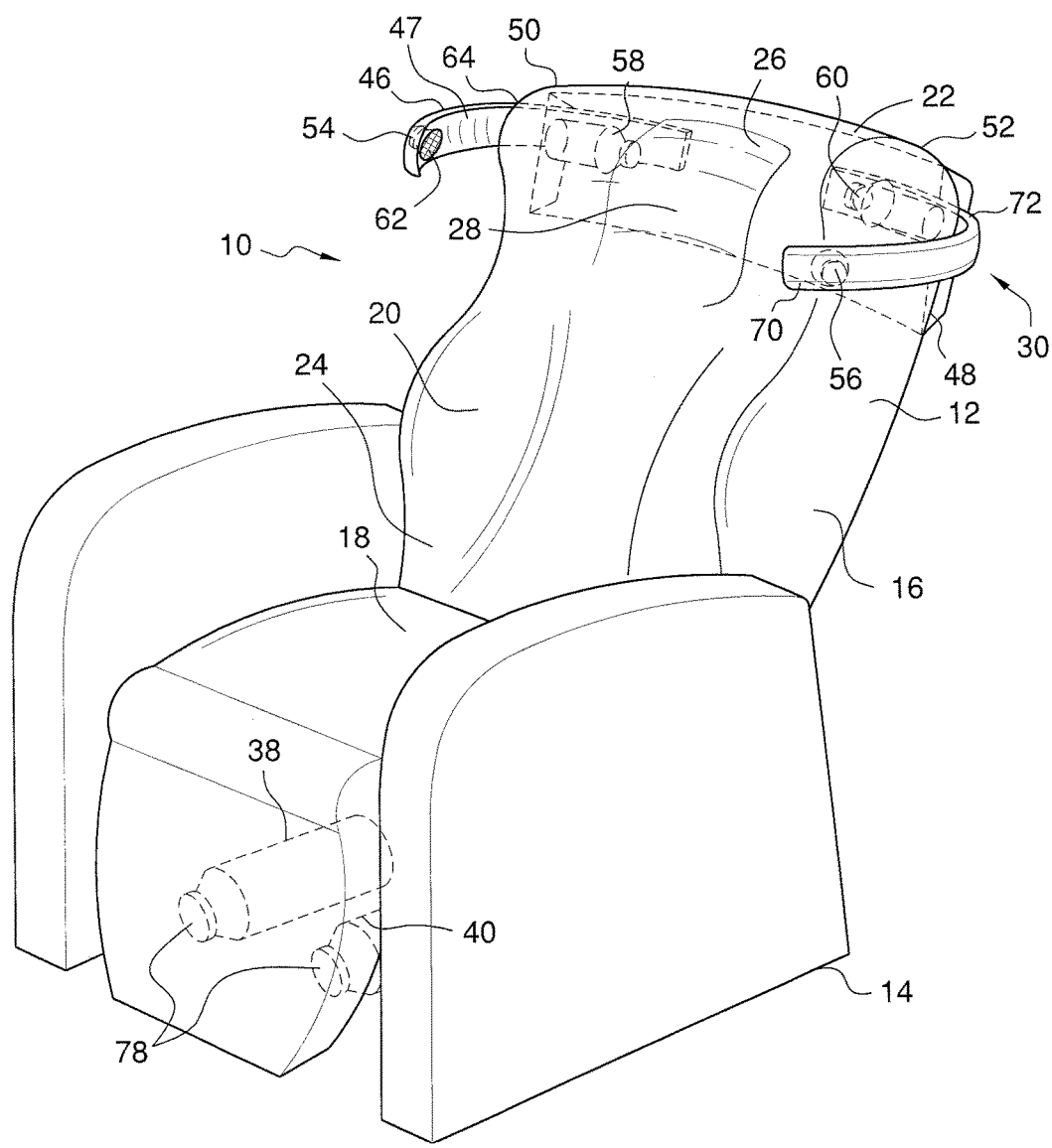
FIG. 1 is a perspective view of an aircraft seat in accordance with a first embodiment of the present invention and with the directional sound assembly in its extended use orientation.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

In accordance with the present invention, and with reference to FIGS. 1 to 5, a loudspeaker system 10 integrated into an aircraft seat 12 is disclosed. The present aircraft seat 12 with an integrated loudspeaker system 10 creates an isolated sound stage designed to prevent egress from one aircraft seating area to another aircraft seating area. By isolating one seating area from another seating area passengers are inclined to not use headphones, providing passengers with an alternative to headphones when confronted with long flights. The present loudspeaker system 10 is particularly adapted for use in first class aircraft "suites". These suites occupy a limited space, but provide passengers with a high level of privacy and comfort.

The aircraft seat 12 is a conventional aircraft seat and includes a base support structure 14 upon which a seat body 16 is mounted. The seat body 16 includes a horizontally oriented seat bottom 18 and a seat back 20 secured thereto for supporting the back of a passenger sitting within the aircraft seat 12. Those skilled in the art will appreciate the seat back 20 is preferably pivotally secured to the seat bottom 18 and may, therefore, change its angular orientation relative to the seat bottom 18 at the discretion of the passenger. In fact, many aircraft now offer seats with seat backs 20 that may be pivoted between an upright sitting position with the seat back 20 substantially vertically oriented and a lying position with the seat back 20 substantially horizontally oriented. The present invention should not be construed as being limited to the specifics of the seat itself, as the present loudspeaker system 10 may be implemented in a variety of aircraft seat constructions without departing from the spirit of the present invention.

In addition, although the present loudspeaker system 10 is disclosed herein as being employed within an aircraft seat, it is contemplated the principles of the present invention may be employed in a variety of seating structures.

The seat back 20 includes an upper end 22 and a lower end 24. The lower end 24 is positioned adjacent the seat bottom 18 for supporting the lower back portion of the passenger, while the upper end 22 of the seat back 20 includes a forward facing headrest structure 26 for supporting the head and upper back of the passenger as he or she sits within the aircraft seat 12. In particular, and in accordance with a preferred embodiment of the present invention, the headrest structure 26 includes an ergonomically formed head support portion 28 specifically designed to support the passenger's head in a comfortable and stable manner.

Although a seat back with an integrally formed headrest structure is disclosed in accordance with a preferred embodiment of the present invention, and is commonly employed in the aircraft industry for the design of the seat backs, it is contemplated the headrest structure may be a separate structure selectively secured to the remainder of the seat back for forming a complete seat structure in accordance with the present invention.

The loudspeaker system 10 specifically includes a directional sound assembly 30 and a nondirectional sound assembly 32. The nondirectional sound assembly 32 includes a low frequency driver assembly 34. The low frequency driver assembly 34 is preferably secured at a position adjacent an underside 36 of the seat bottom 18. The output of the low frequency driver assembly 34 is ported for transmitting the low frequency elements of a sound signal within the immediate proximity of the passenger as he or she sits on the aircraft seat 12.

Figure 2:
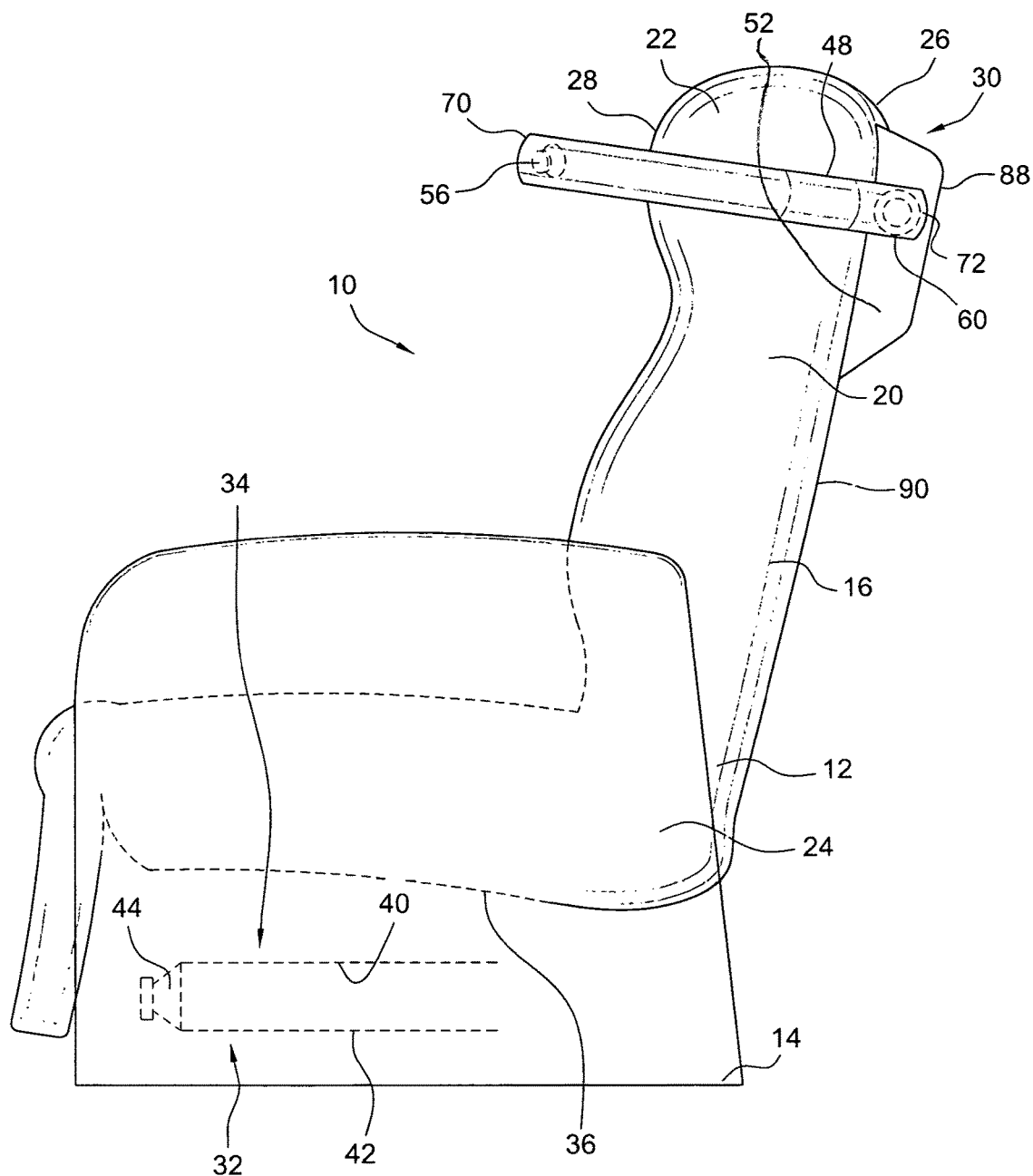
FIG. 2 is a side view of the aircraft seat shown with reference to FIG. 1.
Figure 3:
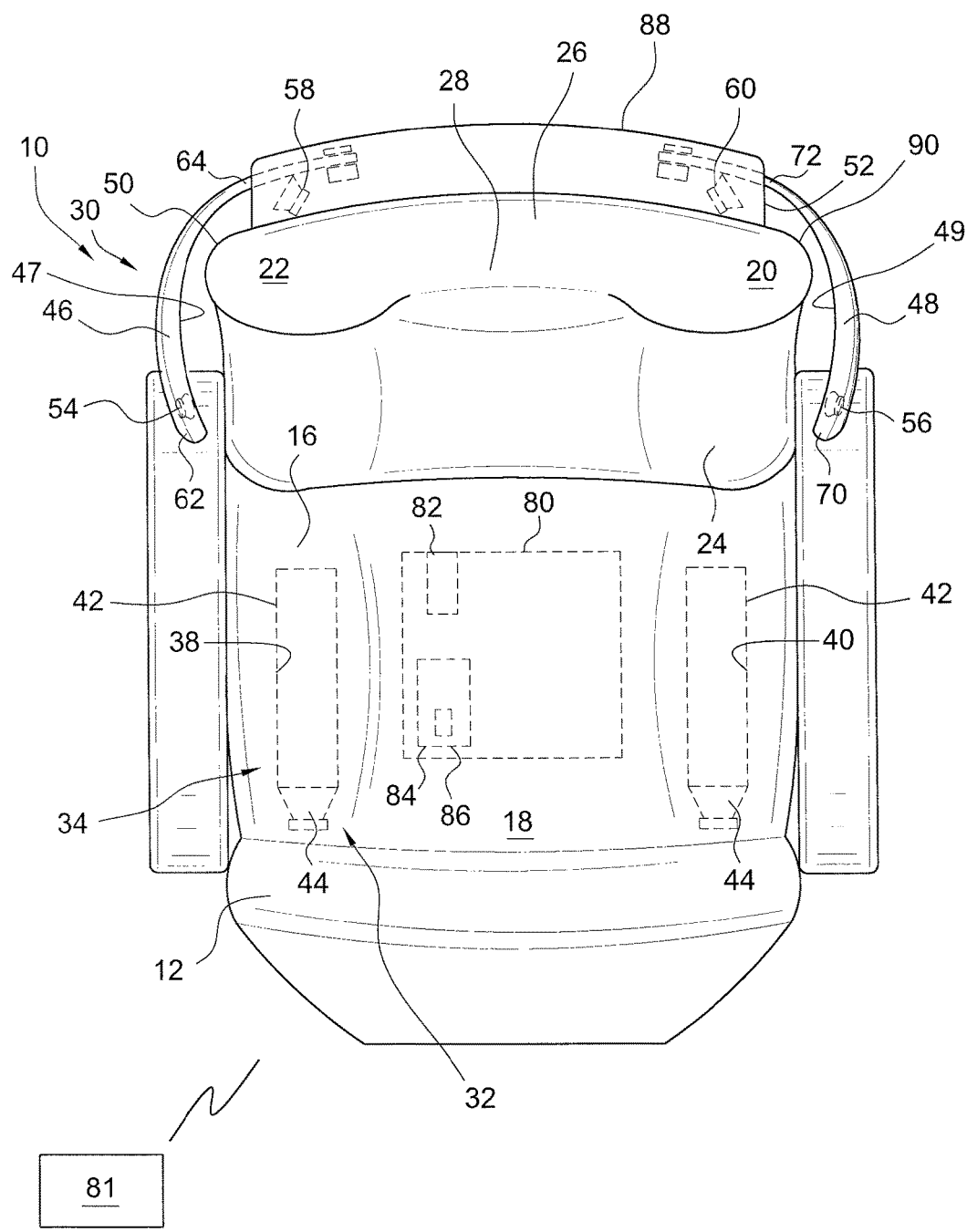
FIG. 3 is a top view of the aircraft seat shown with reference to FIG. 1.
Figure 4:
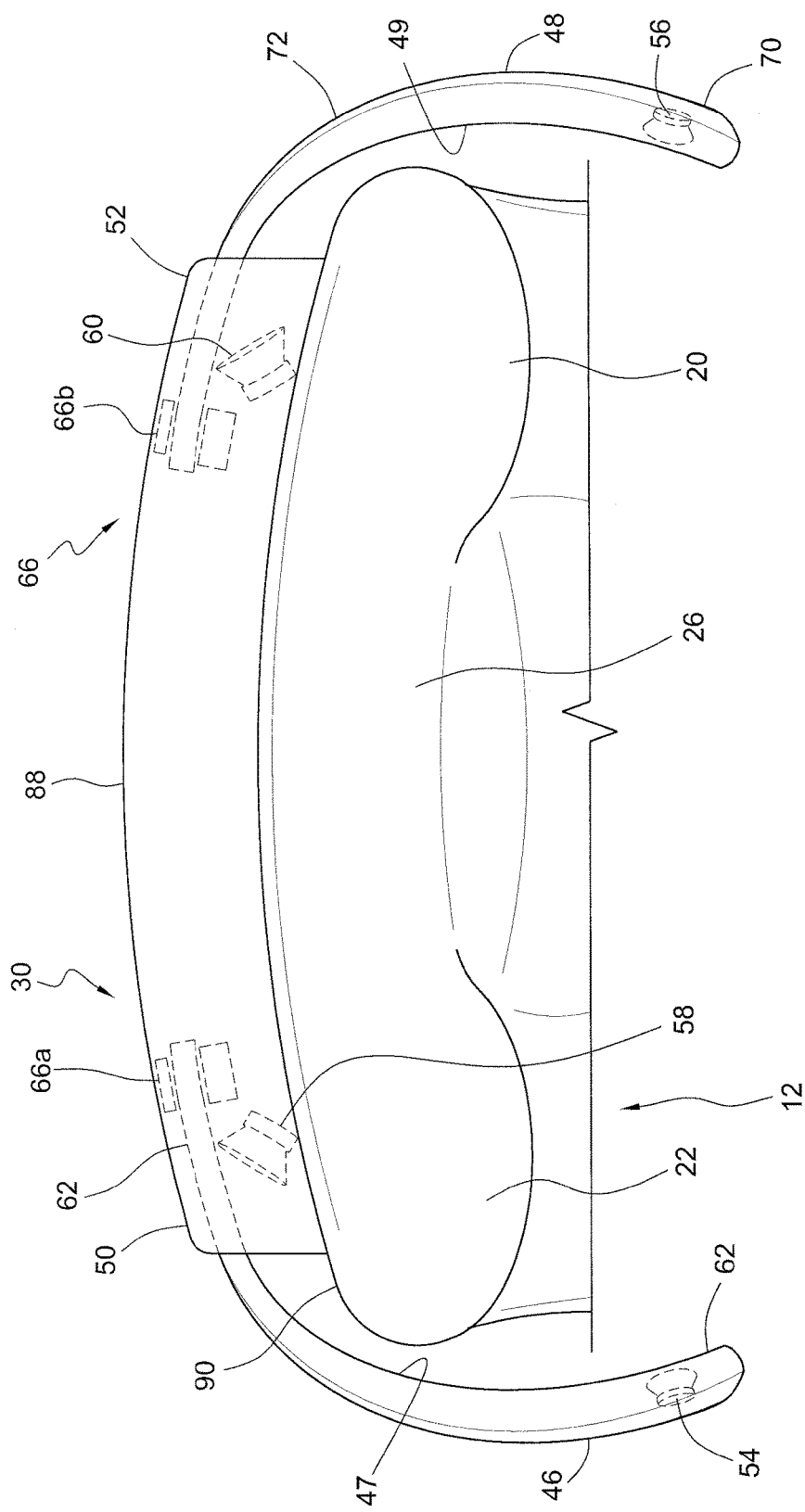
FIG. 4 is a detailed top view showing the directional sound assembly in its extended use orientation.
Figure 5:
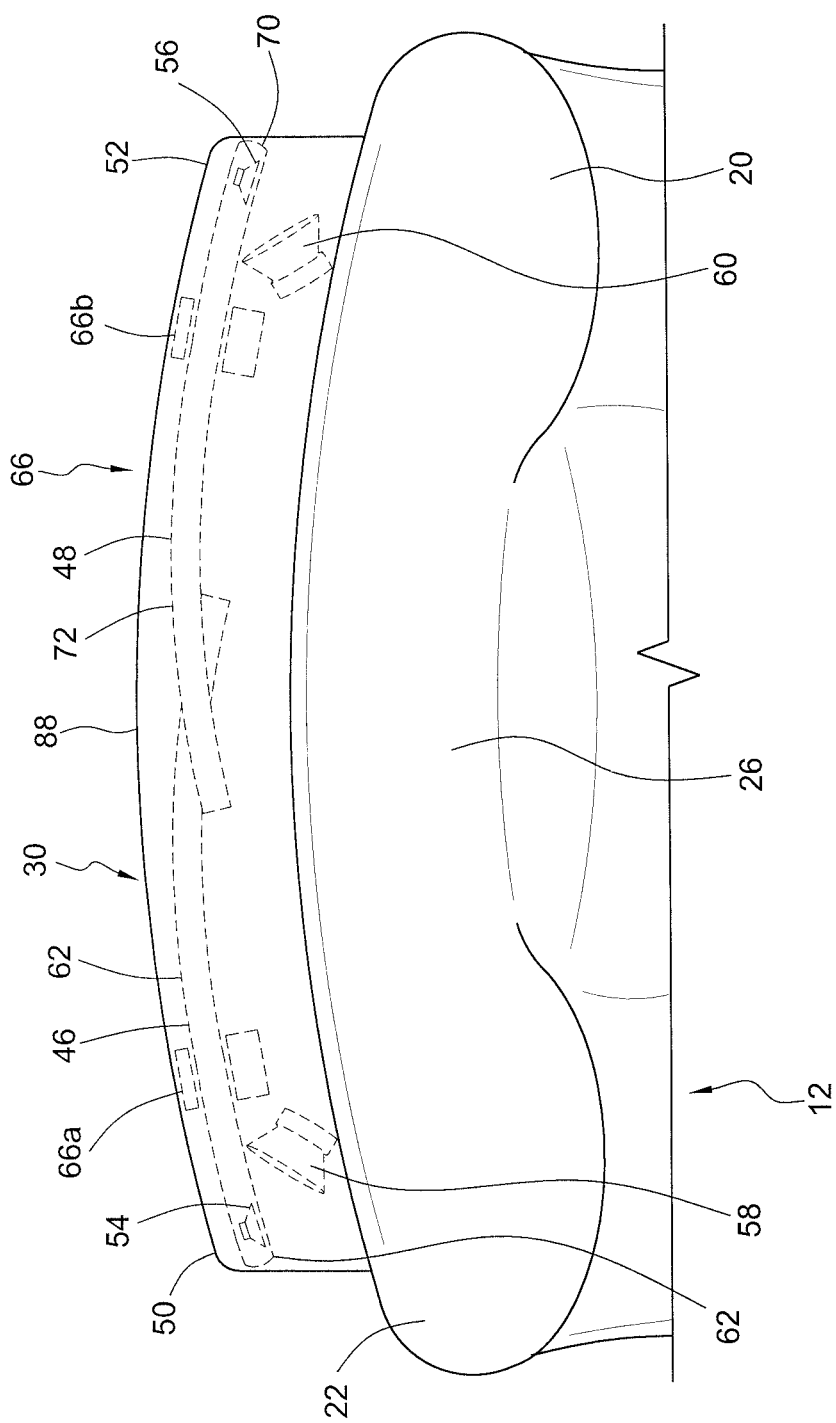
FIG. 5 is a detailed top view showing the directional sound assembly in its retracted storage orientation.

In accordance with a preferred embodiment and with reference to FIGS. 1, 2 and 3, the low frequency driver assembly 34 takes the form of a ported arrangement. More particularly, the lower frequency driver assembly 34 includes first and second subwoofers 38, 40, each subwoofer 38, 40 including a housing 42 with a driver 44 mounted thereto for the transmission of sound through the housing 42.

The low frequency driver assembly 34 is further provided with a conventional crossover circuit (not shown). In this way, the present loudspeaker system may be wired to a conventional receiver in much the same manner prior art subwoofer/satellites are wired. The use of a ported subwoofer arrangement allows for the employment of small diameter drivers minimizing the space required for implementation of the present loudspeaker assembly.

The directional sound assembly 30 is mounted within the headrest structure 26 for selective extension to a use orientation (see FIGS. 1, 2, 3 and 4) by the passenger when he or she desires to listen to audio and/or watch video. In accordance with a preferred embodiment of the present invention, the directional sound assembly 30 is mounted for selective movement between a storage orientation (see FIG. 5) in which the directional sound assembly 30 is housed and hidden within a supporting housing 88 mounted along the backside 90 of the headrest structure 26 and a use orientation in which the directional sound assembly 30 is extended from the supporting housing 88 mounted along the backside 90 of the headrest structure 26 for positioning in a facing relationship with the head support portion 28 for use as described herein in greater detail.

In particular, the directional sound assembly 30 includes a first support arm 46 and a second support arm 48. The first support arm 46 extends from a first side 50 of the supporting housing 88 and is arcuately shaped to extend from the headrest structure 26 for positioning in a facing relationship with the head support portion 28 so as to wrap about one side of the head of a passenger as he or she sits on the aircraft seat 12. Similarly, the second support arm 48 extends from a second side 52 of the supporting housing 88 and is arcuately shaped to extend from the opposite side of the headrest structure 26 for positioning in a facing relationship with the head support portion 28 so as to wrap about the opposite side of the head of a passenger as he or she sits within the aircraft seat 12. As will be discussed in greater detail below, the first and second support arms 46, 48 function to support the high frequency drivers 54, 56 and transmit the sound generated by the mid-range drivers 58, 60 for the pleasure of the passenger. As discussed above, the first and second support arms 46, 48 are mounted upon the headrest structure 26 for selective movement between a use orientation and a storage orientation.

The first support arm 46 includes a free first end 62 and a second end 64 that is coupled to the retraction control mechanism 66 of the present directional sound assembly 30. The retraction control mechanism 66 employs first and second drive assemblies 66a, 66b which retract and extend the first and second support arms 46, 48 from the support housing 88 for proper positioning thereof within the limited space confines of an aircraft. As will be appreciated based upon the following disclosure, the first and second support arms 46, 48 are designed for ease of installation, replacement and repair. In addition, the operation and use of the first and second support arms 46, 48 must be foolproof and ultimately safe to prevent inadvertent injury to passengers.

A first high frequency driver 54 is secured to the first end 62 of the first support arm 46 such that it faces a passenger sitting within the aircraft seat 12 when it is extended to its use orientation. Wiring for transmission of sound signals to the first high frequency driver 54 passes through a lumen (not shown) formed in the first support arm 46.

The second support arm 48 includes a free first end 70 and a second end 72 that is coupled to the retraction control mechanism 66, in particular, second drive assembly 66b, of the present directional sound assembly 30. A second high frequency driver 56 is secured to the first end 70 of the second support arm 48 such that it faces the passenger sitting within the aircraft seat 12 when it is extended to its use orientation. Wiring for transmission of sound signals to the second high frequency driver 56 passes through a lumen formed in the second support arm 48.

The mid-range portion of an acoustic signal for transmission by the directional sound assembly 30 is generated by first and second mid-range drivers 58, 60 mounted within the support housing 88 secured along the backside 90 of the headrest structure 26 adjacent the respective second ends 64, 72 of the first support arm 46 and the second support arm 48 when the directional sound assembly 30 is in its extended use orientation as shown with reference to FIGS. 1, 2, 3 and 4. With reference to the use orientation as shown in FIGS. 1, 2, 3 and 4, the first mid-range driver 58 is positioned within the support housing 88 adjacent the second end 64 of the first support arm 46 such that the sound waves generated by the first mid-range driver 58 reflect off the internal concave surface 47 of the first support arm 46 along the length thereof to a point adjacent the first end 62 of the first support arm 46 where the sound waves are directed for audible transmission to the passenger sitting between the first ends 62, 70 of the respective first and second support arms 46, 48. Thus, the sound waves propagate from the first mid-range driver 58 to the immediate vicinity of the passenger. Transmission of the sound waves generated by the first midrange driver 58 is achieved in accordance with well known acoustic principles allowing for the propagation of sound along curved surfaces.

In addition to the propagation of the sound along the first support arm 46 through the reflection thereof at positions adjacent the second end 64 of the first support arm 46 and the first end 62 of the first support arm 46, the sound waves generated by the first mid-range driver 58 will cause vibration of the first support arm 46 in a manner transmitting sound generated within the headrest structure 26 to the first support arm 46 and ultimately to the ear of the passenger.

The second mid-range driver 60 is positioned within the support housing 88 secured to the backside of the headrest structure 26 adjacent the second end 72 of the second support arm 48 when the directional sound assembly 30 is in its use orientation as shown with reference to FIGS. 1, 2, 3 and 4. When in this use orientation the sound waves generated by the second mid-range driver 60 reflect off the internal concave surface 49 of the second support arm 48 along the length thereof to a point adjacent the first end 70 of the second support arm 48 where the sound waves are directed for audible transmission to the passenger sitting between the first ends 62, 70 of the respective first and second support arms 46, 48. Thus, the sound waves propagate from the second mid-range driver 60 to the immediate vicinity of the passenger. Transmission of the sound waves generated by the second midrange driver 60 is achieved in accordance with the principles described above with regard to the transmission of the sound waves generated by the first mid-range driver 58. In addition to the propagation of the sound along the second support arm 48 through the reflection thereof at positions adjacent the second end 72 of the second support arm 48 and the first end 70 of the second support arm 48, the sound waves generated by the second mid-range driver 60 will cause vibration of the second support arm 48 in a manner transmitting sound generated within the headrest structure 26 to the second support arm 48 and ultimately to the ear of the passenger.

By providing a directional sound assembly 30 which directly transmits sound to the passenger sitting within a seat and a nondirectional sound assembly 32 that is directly secured to the aircraft seat 12 for transmission of low frequency sound to a passenger sitting within the aircraft seat 12, the present loudspeaker system 10 focuses sound directly upon the passenger sitting within the aircraft seat 12. However, it is important that, while the sound experience of the passenger employing the present loudspeaker system be at the highest quality level possible, the experience of one passenger must not negatively affect those passengers sitting adjacent, or in a suite next to the passenger using the present loudspeaker system.

Referring to FIG. 3, the present loudspeaker system 10, therefore, employs a progressive compression system 80 to minimize disturbance to adjacent passengers while maximizing the enjoyment of the passenger using the present loudspeaker system 10. The progressive compression system 80 achieves this goal by monitoring ambient sound, the signals being transmitted to the loudspeaker system 10, the sound volume desired by the passenger, the known effect different altitudes have upon the propagation and instigation of sound, as well as other factors to optimize the sound signal ultimately employed by the loudspeaker system 10 in such a manner that it provides the passenger with high quality sound without disturbing passengers who might be sitting adjacent thereto.

More particularly, the progressive compression system 80 includes a digital audio input 82 for receiving the complete sound signal from an audio source 81. The complete sound signal is input to a sound processor 84 which first analyzes the components of the complete sound signal, the volume desired by the passenger and the ambient sound within the aircraft. From this information, the sound processor 84 employs an algorithm for sound compression and alteration which determines optimal sound characteristics for both the passenger and those sitting adjacent to the passenger. The optimal sound characteristics are implemented by a digital signal processor 86 which acts upon the complete sound signal to create an attenuated sound signal. The attenuated sound signal is ultimately transmitted to the low frequency 34, mid-range 58, 60 and high frequency drivers 54, 56 of the present loudspeaker system 10 via audio wires (not shown) for the creation of a sound field to be enjoyed by the passenger employing the present loudspeaker system 10 without unduly disturbing those sitting in the vicinity of the passenger. In accordance with a preferred embodiment of the present invention, the low end of the frequency range will only be approximately 80 to 90 Hz allowing for the implementation of a low frequency driver system of desirable size and weight characteristics.

Figure 6:
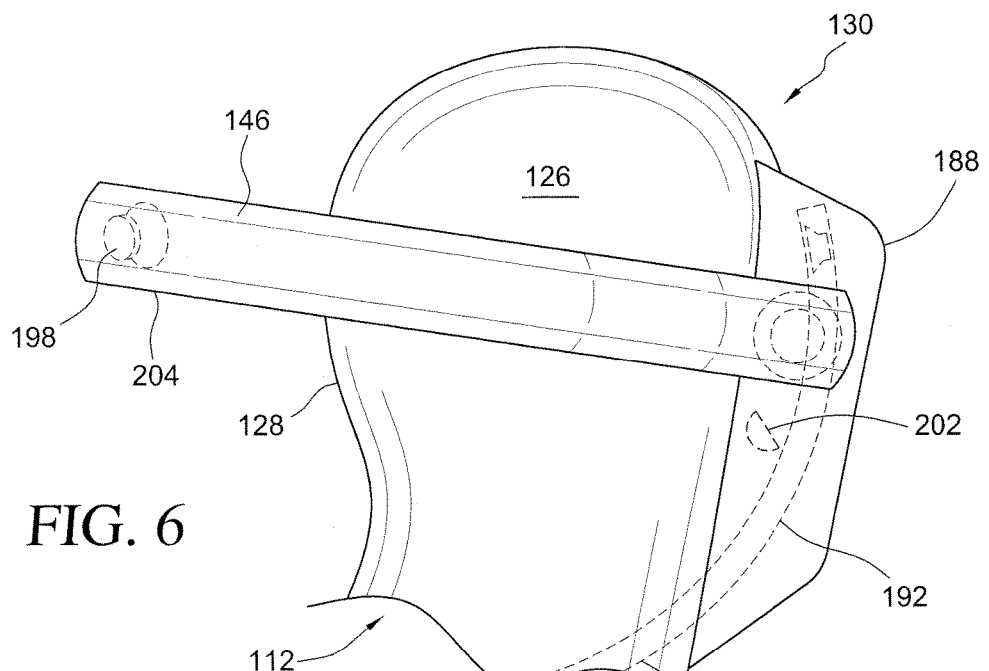
FIGS. 6, 7 and 8 are, respectively, a partial side view showing the left side arms in a storage orientation, a partial side view showing the left side arms in an extended use orientation, and a perspective view of an alternate embodiment employing left and right rear channel support arms, as well as a center channel sound support arms, in addition to the first and second support arms disclosed in accordance with the embodiment of FIGS. 1-5.

In addition to providing stereo sound with a separate low frequency driver assembly providing for low frequency elements of the sound signal, the present loudspeaker system 10 may be adapted to provide simulated surround sound (for example, 5.1 sound processing) for those passengers watching a movie while taking advantage of the present loudspeaker system 10. In addition to signal processing used to emulating 5.1 sound production with only first and second arms, the directional sound assembly may be adapted to include additional directional drivers as shown with reference to FIGS. 6, 7 and 8.

More particularly, this embodiment provides for 5.1 sound production through the inclusion of a left and right rear channel support arms 192, 194, as well as a center channel sound support arm 196. These support arms 192, 194, 196 are provided in conjunction with first and second support arms (in this embodiment left and right front channel support arms) 146, 148 discussed above with regard to the embodiment disclosed with reference to FIGS. 1 to 5.

Since the left and right front channel support arms 146, 148 are substantially the same as those discussed above with regard to FIGS. 1 to 5, reference is made to the prior disclosure for a complete discussion as to their structure. With regard to the left and right rear channel support arms 192, 194, the left rear channel support arm 192 extends from a left top side of the supporting housing 188 mounted along the backside of the headrest structure 126 and is arcuately shaped to extend from the headrest structure 126 for positioning in a facing relationship with the head support portion 128 so as to wrap about the upper left side of the head of a passenger as he or she sits within the aircraft seat 112. Similarly, the right rear channel support arm 194 extends from a right top side of the supporting housing 188 mounted along the backside 190 of the headrest structure 126 and is arcuately shaped to extend from the opposite side of the headrest structure 126 for positioning in a facing relationship with the head support portion 128 so as to wrap about the upper right side of the head of a passenger as he or she sits within the aircraft seat 112. The left and right rear channel support arms 192, 194 function to support high frequency drivers 198, 200 and transmit the sound generated by mid-range drivers 202 (only the mid-range driver associated with the left rear channel support arm 192 is shown and it should be appreciated the mid-range driver associated with the right rear channel support arm 194 is identical). The left and right rear channel support arms 192, 194 are mounted upon the headrest structure 26 for selective movement between the use orientation (see FIGS. 7 and 8) and the storage orientation (see FIG. 6).

The left rear channel support arm 192 includes a free first end 204 and a second end 206 that is coupled to the retraction control mechanism 166 of the present directional sound assembly 30. The retraction control mechanism 166 employs first, second, third, fourth and fifth drive assemblies identical to those disclosed with reference to the embodiment disclosed in FIGS. 1 to 5 (although only the drive assembly 166a associated with the left rear channel support arm 192 is shown) which retract and extend the various support arms 146, 148, 192, 194, 196 from the support housing 188 for proper positioning thereof within the limited space confines of an aircraft. A first high frequency driver 198 is secured to the first end 204 of the left rear channel support arm 192 such that it sits over the upper left portion of a passenger sitting within the aircraft seat 112 when it is extended to its use orientation so as to transmit rear channel signals in a desired manner. Wiring for transmission of sound signals to the first high frequency driver 198 passes through a lumen (not shown) formed in the left rear channel support arm 192.

The right rear channel support arm 194 includes a free first end 208 and a second end 210 that is coupled to the retraction control mechanism 166 of the present directional sound assembly 130. A second high frequency driver 200 is secured to the first end 208 of the right rear channel support arm 194 such that it sits over the upper right portion of a passenger sitting within the aircraft seat 112 when it is extended to its use position so as to transmit rear channel signals in a desired manner. Wiring for transmission of sound signals to the second high frequency driver 200 passes through a lumen formed in the right rear channel support arm 194.

Figure 7:
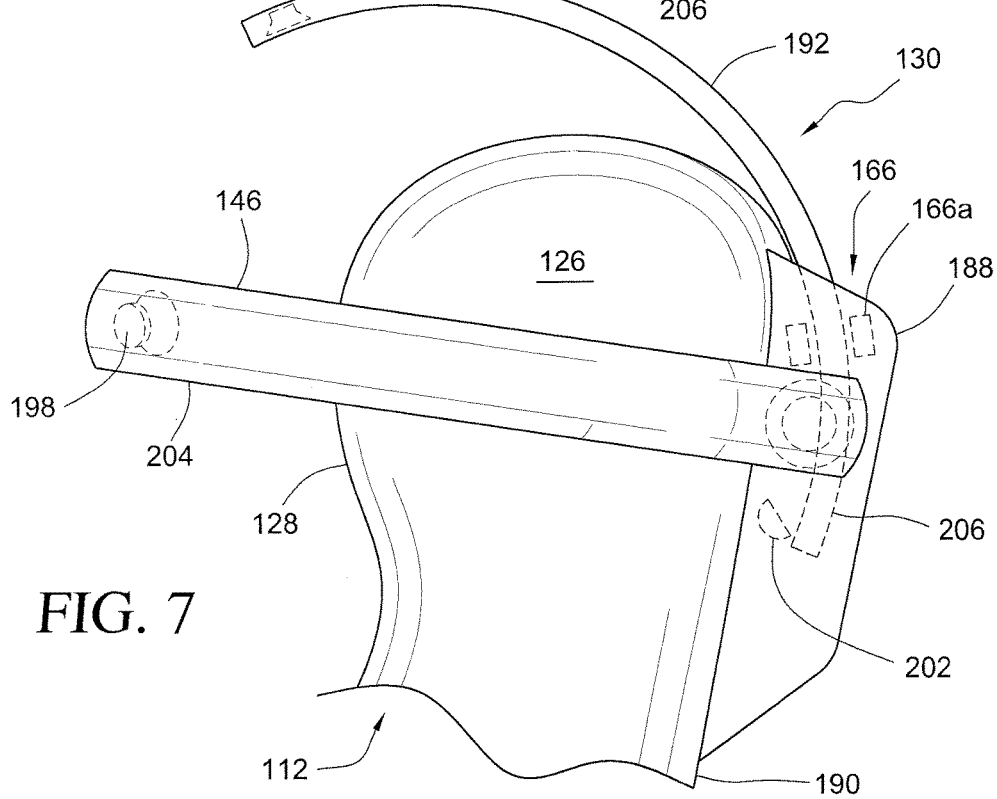
Figure 8:
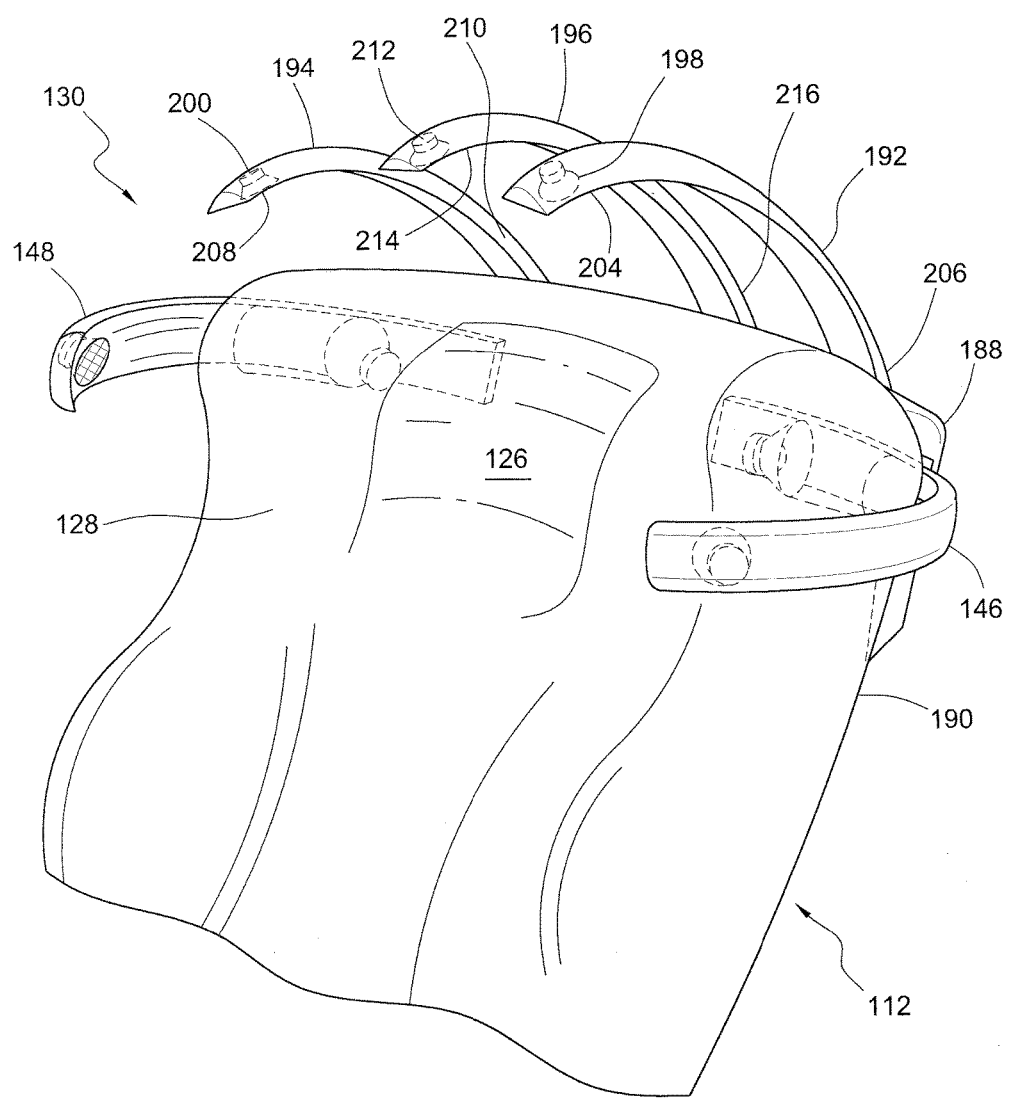

The mid-range portion of an acoustic signal for transmission by the right and left rear channel support arms 192, 194 of the directional sound assembly 130 is generated by left and right rear channel mid-range drivers 202 (as discussed above only the mid-range driver associated with the left rear channel support is shown) mounted within the support housing 188 secured along the backside 190 of the headrest structure 126 adjacent the respective second ends 206, 210 of the left rear channel support arm 192 and the right rear channel support arm 194 when the directional sound assembly 130 is in its extended use orientation as shown with reference to FIGS. 7 and 8.

In addition to the left and right rear channel support arms 192, 194, the present embodiment provides a center channel support arm 196. The center channel support arm 196 extends from a central top side of the supporting housing 188 and is arcuately shaped to extend from the headrest structure 126 for positioning in a facing relationship with the head support portion 128 so as to wrap about the upper central portion of the head of a passenger as he or she sits within the aircraft seat 112. The center channel support arm 196 functions to support a high frequency driver 212 and transmit the sound generated by a mid-range driver (same as that shown with reference to the mid-range drivers 58, 60, 202 of the left rear channel support arm 192 of FIG. 7 and the embodiments shown with reference to FIGS. 1 to 5). The center channel support arm 196 is mounted upon the headrest structure 126 for selective movement between the use orientation and the storage orientation.

The center channel support arm 196 includes a free first end 214 and a second end 216 that is coupled to the retraction control mechanism 166 of the present directional sound assembly 130. The first high frequency driver 212 is secured to the first end 214 of the center channel support arm 196 such that it sits over the top portion of a passenger sitting within the aircraft seat 112 when it is extended to its use position so as to transmit center channel signals in a desired manner. Wiring for transmission of sound signals to the first high frequency driver passes through a lumen (not shown) formed in the center channel support arm.

The mid-range portion of an acoustic signal for transmission by the center channel support arm 196 of the directional sound assembly 130 is generated by a center channel mid-range driver mounted within the support housing secured along the backside of the headrest structure 26 adjacent the second end of the center channel support arm when the direction sound assembly 30 is in its extended use orientation as shown with reference to FIGS. 7 and 8. Although not shown in FIGS. 7 and 8, the mid-range driver employed by the center channel support arm is positioned within the support housing for positioning adjacent the second end of the center channel support arms in the same manner as described above with regard to the support arms shown with reference to FIGS. 1 to 5.

Figure 9:
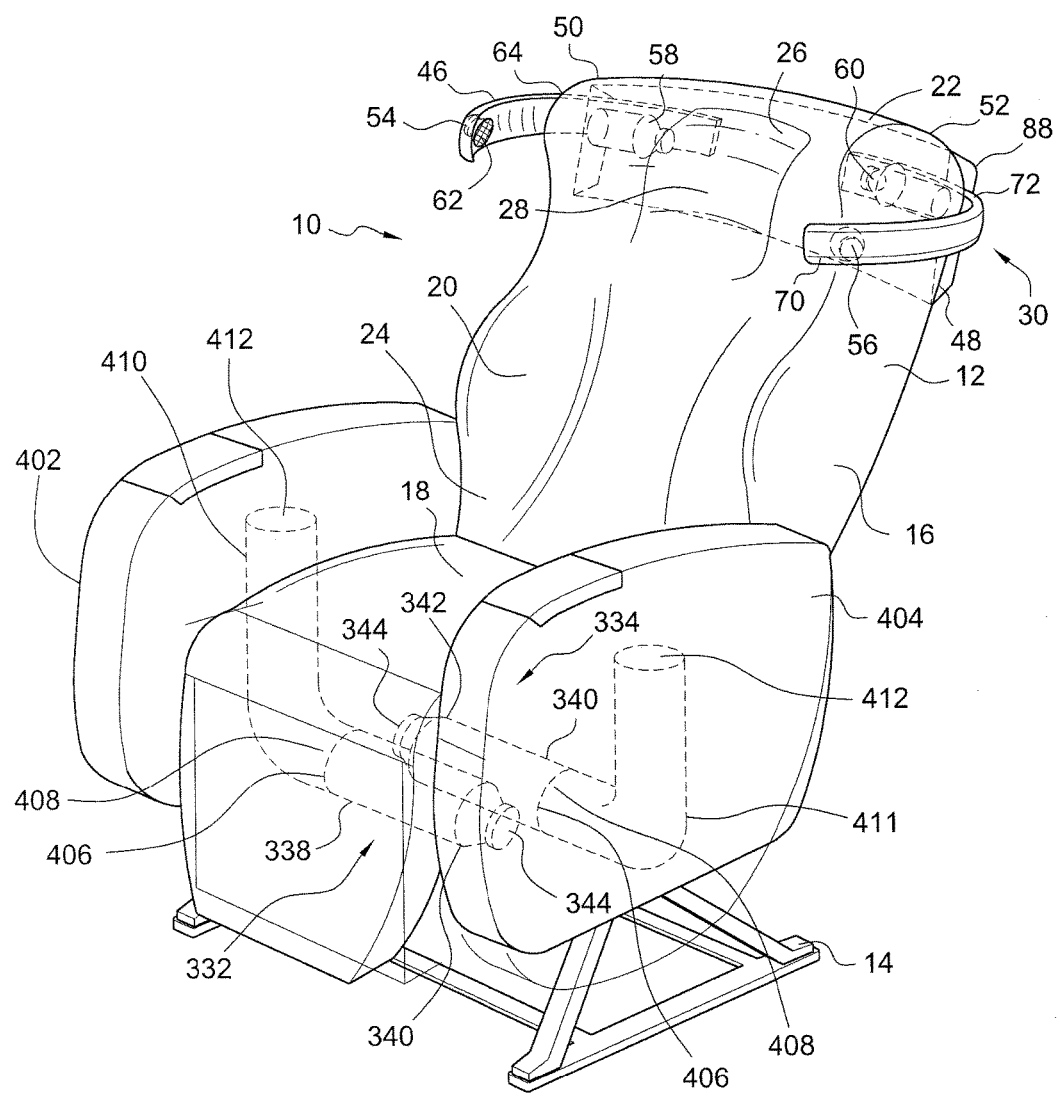
FIG. 9 shows an alternate embodiment in accordance with the present invention.

An alternate embodiment of the present invention is shown with reference to FIG. 9. This embodiment is substantially similar to the embodiment disclosed with reference to FIGS. 1 to 5 but includes an alternate mounting structure for the low frequency driver assembly 334. As such, reference numerals similar to those in conjunction with FIGS. 1 to 5 are used herein for elements previously discussed above and which are not altered in accordance with this embodiment.

In accordance with this embodiment, the lower frequency driver assembly 334 includes first and second subwoofers 338, 340, each subwoofer 338, 340 including a housing 342 with a driver 344 mounted thereto for the transmission of sound through the housing 342. The low frequency driver assembly 334 is further provided with a conventional crossover circuit (not shown). In this way, the present loudspeaker system may be wired to a conventional receiver in much the same manner prior art subwoofer/satellites are wired.

As with the prior embodiment, this embodiment employs a ported subwoofer arrangement. However, the first and second subwoofers 338, 340 respectively port through the first and second armrests 402, 404 of the aircraft seat 312 via flexible conduits 410, 411. This porting arrangement contemplates use with moveable armrests 402, 404 which move up and down in conjunction with reclining of the seat back 20. As such, free ends 406 of the respective housings 342 for the first and second subwoofers 338, 340 are coupled to the first ends 408 of the flexible conduit 410, 411 with the second ends 412 of the flexible conduits 410, 411 positioned within the respective first and second armrests 402, 404 for the porting of sound therefrom. The flexible conduits 410, 411 are made from FAA approved material for use in aircrafts and offer low weight with effective porting of the sound from the first and second subwoofers 338, 340 to the respective first and second armrests 402, 404. As such, when the first and second armrests 402, 404 move up and down as desired by a passenger, the conduits 410, 411 move up and down in conjunction therewith.

In accordance with yet another embodiment of the present invention, and with reference to FIGS. 10 to 14, the loudspeaker system 510 is integrated with a positioning system 610 allowing for adjustments based upon the size and position of the passenger within the seat 512. As with the prior embodiments, the loudspeaker system 510 is incorporated within an aircraft seat 512. The present aircraft seat 512 with an integrated loudspeaker system 510 creates an isolated sound stage designed to prevent egress from one aircraft seating area to another aircraft seating area.

The aircraft seat 512 is a conventional aircraft seat and includes a base support structure 514 upon which a seat body 516 is mounted. The seat body 516 includes a horizontally oriented seat bottom 518 and a seat back 520 secured thereto for supporting the back of a passenger sitting within the aircraft seat 512. The seat back 520 is preferably pivotally secured to the seat bottom 518 and may, therefore, change its angular orientation relative to the seat bottom 518 at the discretion of the passenger. The present invention should not be construed as being limited to the specifics of the seat itself, as the present loudspeaker system 510 may be implemented in a variety of aircraft seat constructions without departing from the spirit of the present invention. In addition, although the present loudspeaker system 510 is disclosed herein as being employed within an aircraft seat, it is contemplated the principles of the present invention may be employed in a variety of seating structures.

The seat back 520 includes an upper end 522 and a lower end 524. The lower end 524 is positioned adjacent the seat bottom 518 for supporting the lower back portion of the passenger, while the upper end 522 of the seat back 520 includes a forward facing headrest structure 526 for supporting the head and upper back of the passenger as he or she sits within the aircraft seat 512. In particular, and in accordance with a preferred embodiment of the present invention, the headrest structure 526 includes an ergonomically formed head support portion 528 specifically designed to support the passenger's head in a comfortable and stable manner. Although a seat back with an integrally formed headrest structure is disclosed in accordance with a preferred embodiment of the present invention, and is commonly employed in the aircraft industry for the design of the seat backs, it is contemplated the headrest structure may be a separate structure selectively secured to the remainder of the seat back for forming a complete seat structure in accordance with the present invention.

The loudspeaker system 510 specifically includes a directional sound assembly 530 and a nondirectional sound assembly 532. The nondirectional sound assembly 532 includes a low frequency driver assembly 534. The low frequency driver assembly 534 is preferably secured at a position adjacent an underside 536 of the seat bottom 518. The output of the low frequency driver assembly 534 is ported for transmitting the low frequency elements of a sound signal within the immediate proximity of the passenger as he or she sits within the aircraft seat 512.

Figure 10:
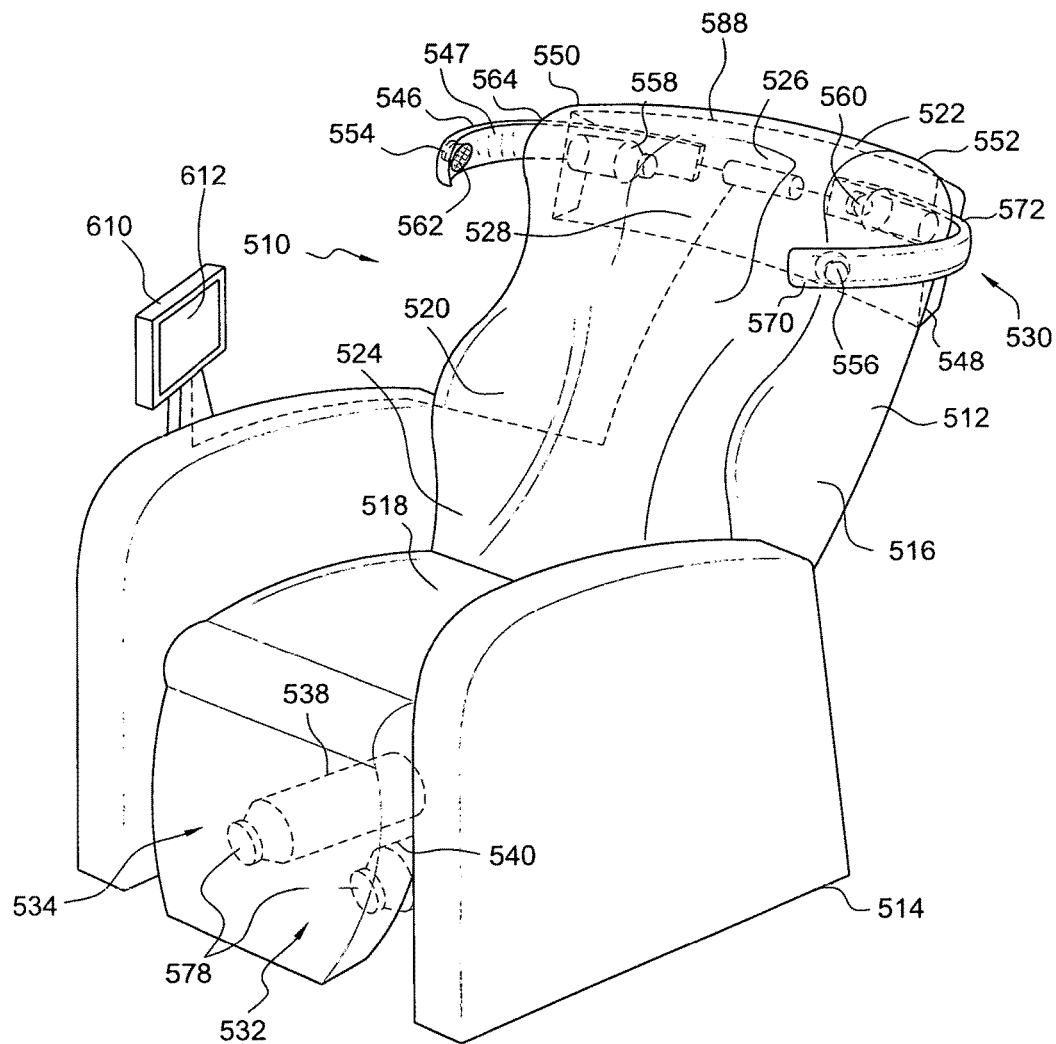
FIG. 10 is a perspective view of an aircraft seat in accordance with a further embodiment with the directional sound assembly in its extended use orientation.
Figure 11:
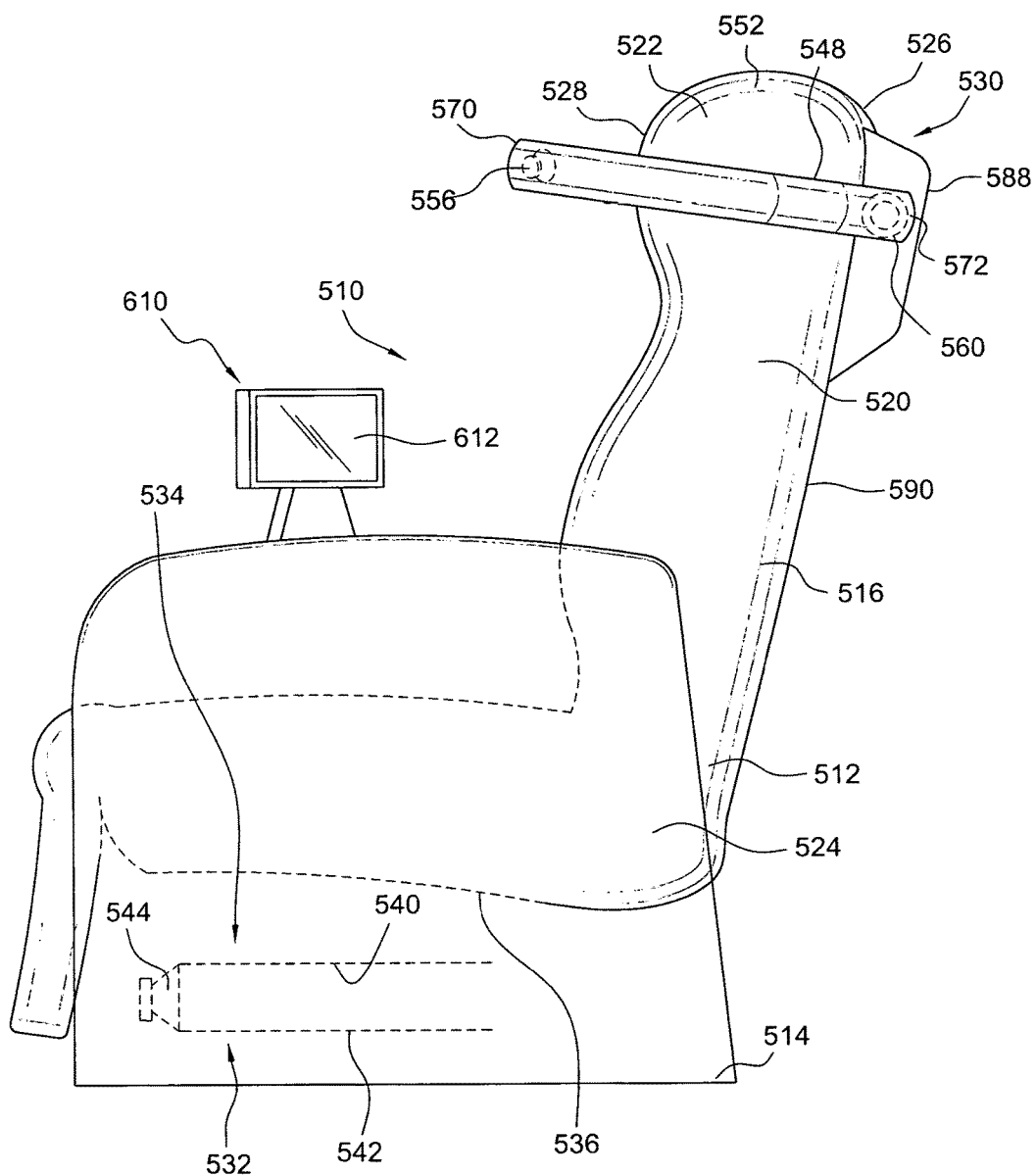
FIG. 11 is a side view of the aircraft seat shown with reference to FIG. 10.
Figure 12:
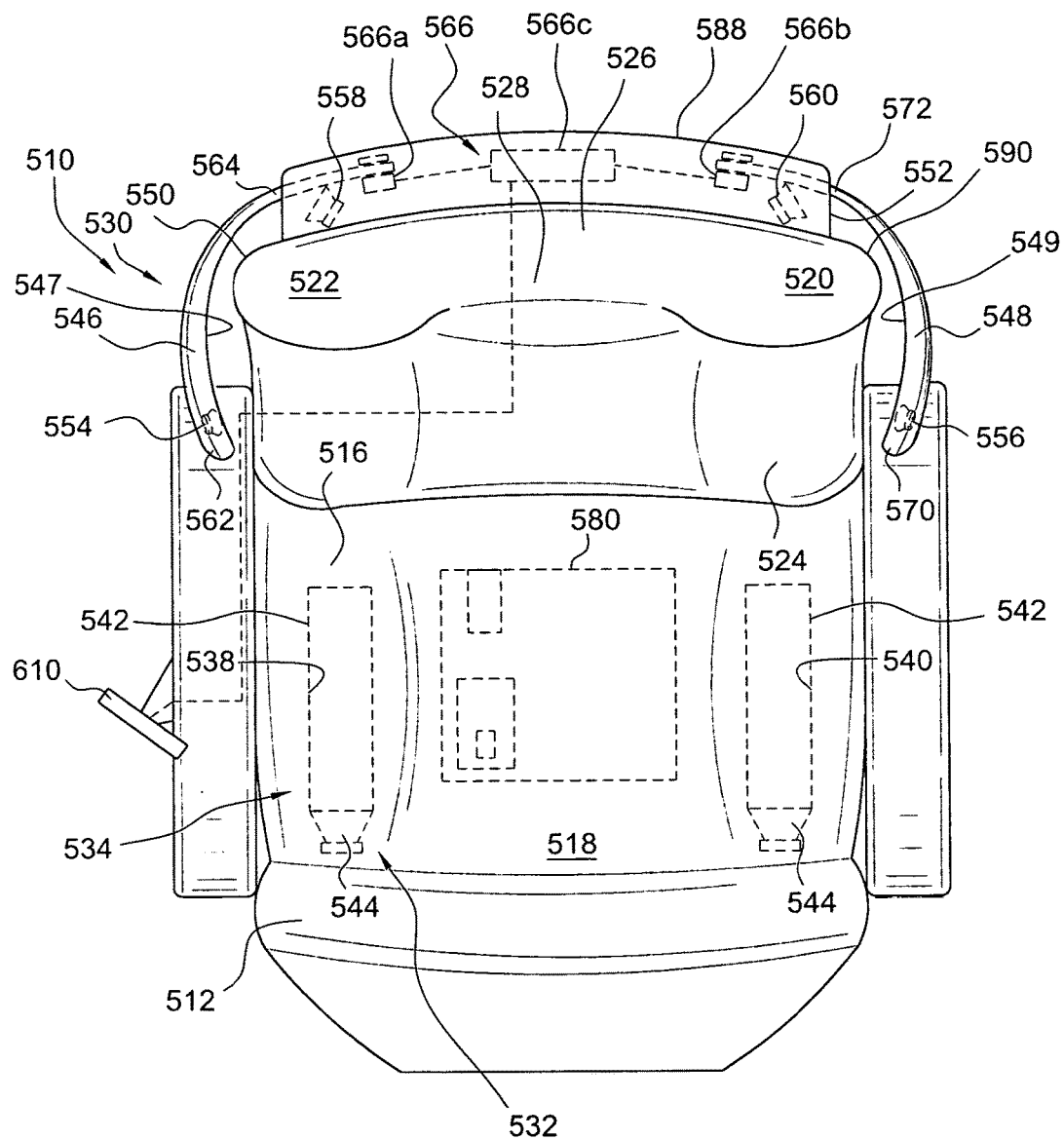
FIG. 12 is a top view of the aircraft seat shown with reference to FIG. 10.
Figure 13:
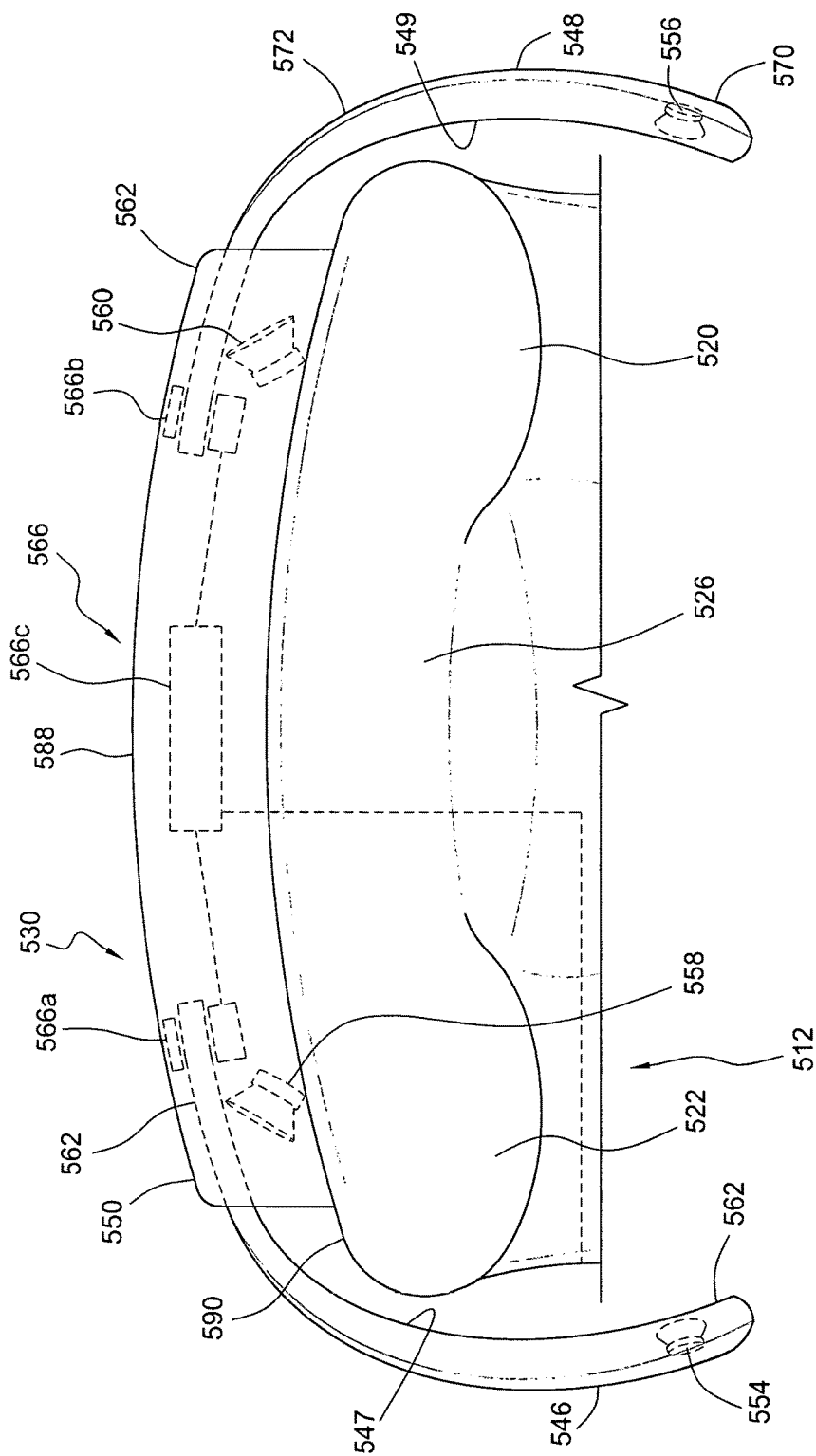
FIG. 13 is a detailed top view showing the directional sound assembly of the embodiment shown with reference to FIG. 10 in its extended use orientation.
Figure 14:
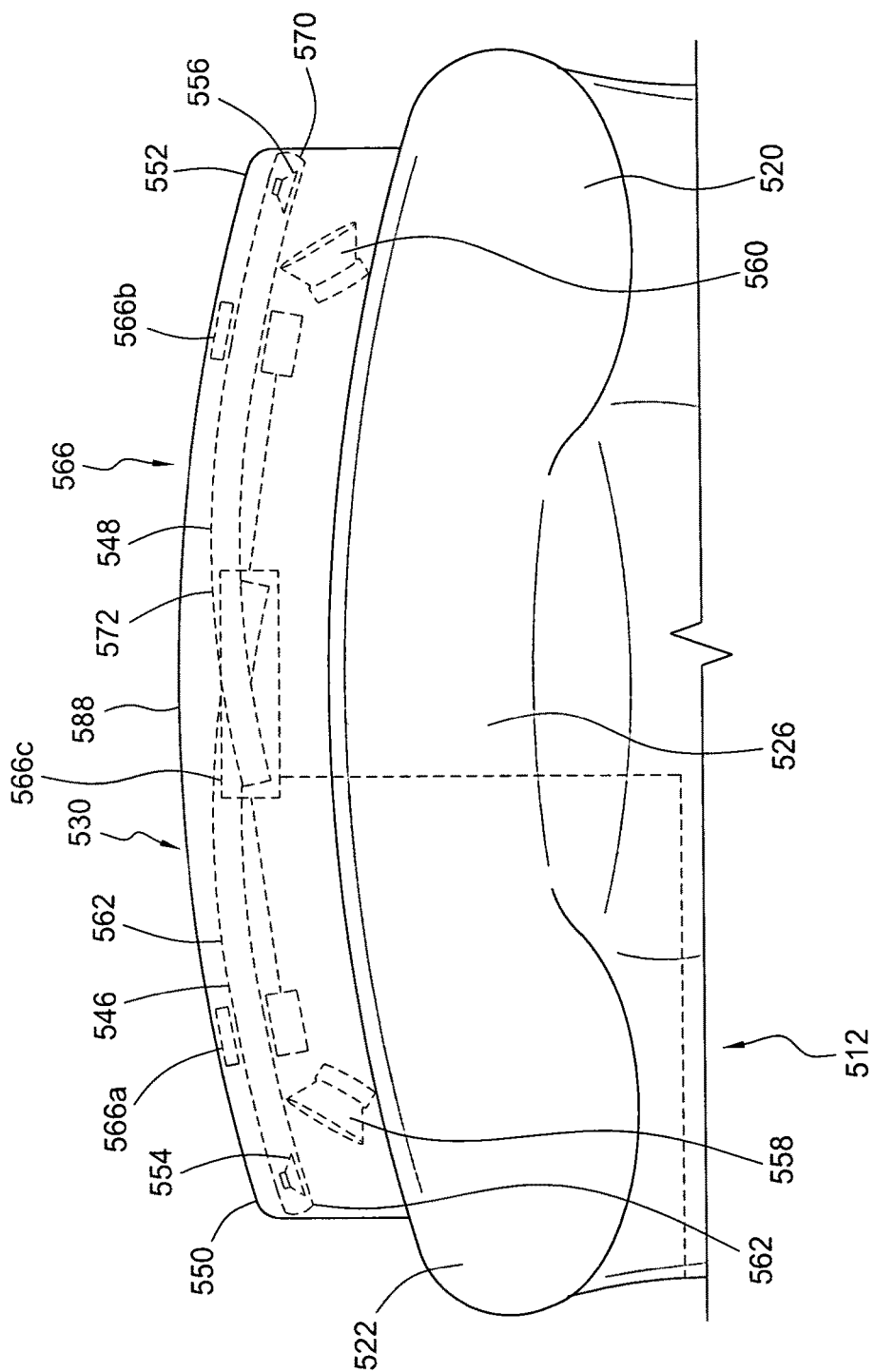
FIG. 14 is a detailed top view showing the directional sound assembly of the embodiment shown with reference to FIG. 10 in its retracted storage orientation.

In accordance with a preferred embodiment and with reference to FIGS. 10, 11 and 12, the low frequency driver assembly 534 takes the form of a ported arrangement. More particularly, the lower frequency driver assembly 534 includes first and second subwoofers 538, 540, each subwoofer 538, 540 including a housing 542 with a driver 544 mounted thereto for the transmission of sound through the housing 542. The low frequency driver assembly 534 is further provided with a conventional crossover circuit (not shown) and may be wired to a conventional receiver in much the same manner prior art subwoofer/satellites are wired.

The directional sound assembly 530 is mounted within the headrest structure 526 for selective extension to a use orientation (see FIGS. 10-13) by the passenger when he or she desires to listen to various audio sources. The directional sound assembly 530 is mounted for selective movement between a storage orientation (see FIG. 14) in which the directional sound assembly 530 is housed and hidden within a supporting housing 588 mounted along the backside 590 of the headrest structure 526 and a use orientation in which the directional sound assembly 530 is extended from the supporting housing 588 mounted along the backside 590 of the headrest structure 526 for positioning in a facing relationship with head support portion 528 for use as described herein in greater detail.

The directional sound assembly 530 includes a first support arm 546 and a second support arm 548. The first support arm 546 extends from a first side 550 of the supporting housing 588 and is arcuately shaped to extend from the headrest structure 526 for positioning in a facing relationship with the head support portion 528 so as to wrap about one side of the head of a passenger as he or she sits within the aircraft seat 512. Similarly, the second support arm 548 extends from a second side 552 of the supporting housing 588 and is arcuately shaped to extend from the opposite side of the headrest structure 526 for positioning in a facing relationship with the head support portion 528 so as to wrap about the opposite side of the head of a passenger as he or she sits within the aircraft seat 512. The first and second support arms 546, 548 function to support the high frequency drivers 554, 556 and transmit the sound generated by the mid-range drivers 558, 560 for the pleasure of the passenger.

The first support arm 546 includes a free first end 562 and a second end 564 that is coupled to a retraction control mechanism 566 of the present directional sound assembly 530. Similarly, the second support arm 548 includes a free first end 570 and a second end 572 that is coupled to the retraction control mechanism 566 of the present directional sound assembly 530. The retraction control mechanism 566 employs first and second drive assemblies 566a, 566b (for example, and in accordance with a preferred embodiment, servo motors linked to the first and second arms 546, 548 for causing movement thereof via various known linkage mechanisms (not shown)) which retract and extend the first and second support arms 546, 548 from the support housing 588 for proper positioning thereof within the limited space confines of an aircraft. The first and second drive assemblies 566a, 566b are under the control of a retraction controller 566c which takes instructions from the positioning system 610 to provide for movement of the first and second arms 546, 548 in a manner optimizing the listening experience of the user. In accordance with a preferred embodiment, the positioning system 610 is in wired communication with the retraction controller 566c for sending positioning information for implementation by the retraction control mechanism 566. Implementation is achieved by the retraction controller 566c that interprets the instructions and activates first and/or second drive assemblies 566a, 566b for extension or retraction of the first and/or second arms 546, 548.

A first high frequency driver 554 is secured to the first end 562 of the first support arm 546 such that it faces a passenger sitting within the aircraft seat 512 when it is extended to its use orientation. Wiring for transmission of sound signals to the first high frequency driver 554 passes through a lumen (not shown) formed in the first support arm 546. As to the second support arm 548, a second high frequency driver 556 is secured to the first end 570 of the second support arm 548 such that it faces the passenger sitting within the aircraft seat 512 when it is extended to its use orientation. Wiring for transmission of sound signals to the second high frequency driver 556 passes through a lumen formed in the second support arm 548.

The mid-range portion of an acoustic signal for transmission by the directional sound assembly 530 is generated by first and second mid-range drivers 558, 560 mounted within the support housing 588 secured along the backside 590 of the headrest structure 526 adjacent the respective second ends 564, 572 of the first support arm 546 and the second support arm 548 when the directional sound assembly 530 is in its extended use orientation as shown with reference to FIGS. 10-13. With reference to the use orientation as shown in FIGS. 10-13, the first mid-range driver 558 is positioned within the support housing 588 adjacent the second end 564 of the first support arm 546 such that the sound waves generated by the first mid-range driver 558 reflect off the internal concave surface 547 of the first support arm 546 along the length thereof to a point adjacent the first end 562 of the first support arm 546 where the sound waves are directed for audible transmission to the passenger sitting between the first ends 562, 570 of the respective first and second support arms 546, 548. Thus, the sound waves propagate from the first mid-range driver 558 to the immediate vicinity of the passenger.

In addition to the propagation of the sound along the first support arm 546 through the reflection thereof at positions adjacent the second end 564 of the first support arm 546 and the first end 562 of the first support arm 546, the sound waves generated by the first mid-range driver 558 will cause vibration of the first support arm 546 in a manner transmitting sound generated within the headrest structure 526 to the first support arm 546 and ultimately to the ear of the passenger.

The second mid-range driver 560 is positioned within the support housing 588 secured to the backside of the headrest structure 526 adjacent the second end 572 of the second support arm 548 when the directional sound assembly 530 is in its use orientation as shown with reference to FIGS. 10-13 such that the sound waves generated by the second mid-range driver 560 reflect off the internal concave surface 549 of the second support arm 548 along the length thereof to a point adjacent the first end 570 of the second support arm 548 where the sound waves are directed for audible transmission to the passenger sitting between the first ends 562, 570 of the respective first and second support arms 546, 548. Thus, the sound waves propagate from the second mid-range driver 560 to the immediate vicinity of the passenger. Transmission of the sound wave generated by the second midrange driver 560 is achieved in accordance with the principles described above with regard to the transmission of the sound waves generated by the first mid-range driver 558.

In addition to the propagation of the sound along the second support arm 548 through the reflection thereof at positions adjacent the second end 572 of the second support arm 548 and the first end 570 of the second support arm 548, the sound waves generated by the second mid-range driver 560 will cause vibration of the second support arm 548 in a manner transmitting sound generated within the headrest structure 526 to the second support arm 548 and ultimate to the ear of the passenger.

The specific location to which sound is transmitted in accordance with the present invention is achieved through the provision of the positioning system 610 briefly mentioned above. The positioning system 610 includes a user interface 612 in the form of a graphical user interface allowing a user to input his or her position within the seat 512. The graphical user interface 612 allows a passenger to input a variety of parameters including the incline of the seat 512 relative to the passenger, the size of the passenger and the angular orientation of the passenger relative to both the seat back 520 and the seat bottom 518.

Once the position information is input by the user, the first and second drive assemblies 566a, 566b are activated to move the first and second arms 546, 548 to specific locations for optimizing the sound performance of the present system.

By providing a directional sound assembly 530 which directly transmits sound to the passenger sitting within a seat and a nondirectional sound assembly 532 that is directly secured to the aircraft seat 512 for transmission of low frequency sound to a passenger sitting within the aircraft seat 512, the present loudspeaker system 510 focuses sound directly upon the passenger sitting within the aircraft seat 512. However, it is important that, while the sound experience of the passenger employing the present loudspeaker system be at the highest quality level possible, the experience of one passenger must not negatively affect those passengers sitting adjacent, or in a suite next to the passenger using the present loudspeaker system.

As with the prior embodiment, this embodiment employs a progressive compression system 80 to minimize disturbance to adjacent passengers while maximizing the enjoyment of the passenger using the present loudspeaker system 10.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A seat integrating a loudspeaker system, comprising:
a seat including a seat body having a horizontally oriented seat bottom and a seat back secured thereto, the seat back includes an upper end and a lower end, the lower end is positioned adjacent the seat bottom;
a loudspeaker system including a sound assembly mounted within the seat back for selective movement between a storage orientation in which the sound assembly is housed and hidden within a support housing mounted along the seat back and a use orientation extending from the support housing in which the sound assembly is positioned for use;
the sound assembly includes a first support arm and a second support arm, the first support arm extends from a first side of the support housing and the second support arm extends from a second side of the support housing; and
a retraction control mechanism that moves the first support arm and the second support arm between the storage orientation and the use orientation, the retraction control mechanism is composed of a drive assembly selectively retracting and extending the first support arm from the support housing and selectively retracting and extending the second support arm from the support housing.

2. The seat according to claim 1, further including a third support arm.

3. The seat according to claim 1, wherein the first support arm is arcuately shaped and the second support arm is arcuately shaped.

4. The seat according to claim 1, wherein the sound assembly is a directional sound assembly and the first and second support arms support high frequency drivers.

5. The seat according to claim 4, wherein the sound assembly includes first and second mid-range drivers mounted within the support housing.

6. The seat according to claim 5, wherein the first support arm is arcuately shaped to wrap about one side of a passenger sitting within the seat and the second support arm is arcuately shaped to wrap about an opposite side of a passenger sitting within the seat, and the first and second support arms transmit sound generated by mid-range drivers.

7. The seat according to claim 1, wherein the sound assembly is a directional sound assembly and includes first and second mid-range drivers mounted within the support housing.

8. The seat according to claim 7, wherein the first and second support arms transmit sound generated by mid-range drivers.

9. The seat according to claim 1, further including a nondirectional sound assembly including a low frequency driver assembly secured at a position adjacent an underside of the seat bottom.

10. The seat according to claim 9, wherein output of the low frequency driver assembly is ported for transmitting the low frequency elements of a sound signal within the immediate proximity of the passenger as he or she sits within the seat.

11. The seat according to claim 9, wherein the low frequency driver assembly includes first and second sub-woofers.

12. The seat according to claim 1, further including a nondirectional sound assembly including a low frequency driver assembly secured at a position adjacent an underside of the seat bottom.

13. A seat integrating a loudspeaker system, comprising:
a seat including a seat body having a horizontally oriented seat bottom and a seat back secured thereto, the seat back includes an upper end and a lower end, the lower end is positioned adjacent the seat bottom;
a loudspeaker system including a sound assembly mounted within the seat back for selective movement between a storage orientation in which the sound assembly is housed and hidden within a support housing mounted along the seat back and a use orientation extending from the support housing in which the sound assembly is positioned for use;
the sound assembly includes a first support arm and a second support arm, the first support arm extends from a first side of the support housing and the second support arm extends from a second side of the support housing; and
a retraction control mechanism that moves the first support arm and the second support arm between the storage orientation and the use orientation, the retraction control mechanism is composed of a drive assembly selectively retracting and extending the first support arm from the support housing and selectively retracting and extending the second support arm from the support housing;
a positioning system in communication with the retraction control mechanism, the positioning system including a user interface in the form of a graphical user interface allowing a user to input his or her position within the seat.

14. The seat according to claim 13, wherein the first support arm is arcuately shaped and the second support arm is arcuately shaped.

15. The seat according to claim 13, wherein the sound assembly is a directional sound assembly and the first and second support arms support high frequency drivers.

16. The seat according to claim 15, wherein the sound assembly includes first and second mid-range drivers mounted within the support housing.

17. The seat according to claim 16, wherein the first support arm is arcuately shaped to wrap about one side of a passenger sitting within the seat and the second support arm is arcuately shaped to wrap about an opposite side of a passenger sitting within the seat, and the first and second support arms transmit sound generated by mid-range drivers.

18. The seat according to claim 13, wherein the sound assembly is a directional sound assembly and includes first and second mid-range drivers mounted within the support housing.

19. The seat according to claim 18, wherein the first and second support arms transmit sound generated by mid-range drivers.

* * * * *